(12) United States Patent
Bower et al.

(10) Patent No.: US 10,934,029 B2
(45) Date of Patent: Mar. 2, 2021

(54) THERMALLY ISOLATING JOINT ASSEMBLY IN A SPACE VEHICLE

(71) Applicants: Paragon Space Development Corporation, Tucson, AZ (US); Thin Red Line Aerospace Ltd., Chilliwack (CA)

(72) Inventors: Chad E. Bower, Littleton, CO (US); Maxim de Jong, Chilliwack (CA); Brian Aiken, Las Vegas, NV (US); Jose Javier Lopez, Tucson, AZ (US)

(73) Assignee: Paragon Space Development Corporation, Tucson, AZ (US)

( * ) Notice: Subject to any disclaimer, the term of this patent is extended or adjusted under 35 U.S.C. 154(b) by 214 days.

(21) Appl. No.: 15/970,741

(22) Filed: May 3, 2018

(65) Prior Publication Data
US 2018/0319516 A1 Nov. 8, 2018

Related U.S. Application Data

(60) Provisional application No. 62/501,599, filed on May 4, 2017.

(51) Int. Cl.
| | |
|---|---|
| *B64G 1/40* | (2006.01) |
| *B64G 1/58* | (2006.01) |
| *B64G 1/64* | (2006.01) |
| *B64G 1/22* | (2006.01) |

(52) U.S. Cl.
CPC ............ *B64G 1/645* (2013.01); *B64G 1/402* (2013.01); *B64G 1/58* (2013.01); *B64G 2001/224* (2013.01)

(58) Field of Classification Search
CPC .......... B64G 1/402; B64G 1/58; B64G 1/645; B64G 2001/224; F16B 2001/0042; F16B 2001/0078; F42B 15/36; F42B 15/38; Y10T 403/11; Y10T 403/13; Y10T 403/21; Y10T 403/213; Y10T 403/217
USPC ...................................... 403/2, 5, 28, 29, 30
See application file for complete search history.

(56) References Cited

U.S. PATENT DOCUMENTS

| | | | | |
|---|---|---|---|---|
| 3,486,410 A | * | 12/1969 | Lake ....................... | F42B 15/38 89/1.14 |
| 5,129,306 A | * | 7/1992 | Fauvel .................... | F42B 15/38 102/378 |
| 5,392,684 A | * | 2/1995 | Renfro .................... | F42B 15/38 102/378 |

(Continued)

FOREIGN PATENT DOCUMENTS

| | | | | |
|---|---|---|---|---|
| EP | 1319920 A1 | * | 6/2003 | ............ F42B 15/38 |
| WO | WO-8707006 A1 | * | 11/1987 | ............ F42B 15/38 |

*Primary Examiner* — Josh Skroupa
(74) *Attorney, Agent, or Firm* — Weaver Austin Villeneuve & Sampson LLP

(57) ABSTRACT

A joint assembly thermally isolates a warm structure, such as a payload, from a cold structure, such as a cryogenic fuel tank, in a space vehicle while maintaining structural interconnection within the joint assembly. The joint assembly includes a primary joint that is capable of separating, and a secondary joint connected to and adjacent to the primary joint. The secondary joint includes an inflatable annulus structure and one or more restraining members, where separation of the primary joint causes the inflatable annulus structure to be in compression and the one or more restraining members to be in tension.

19 Claims, 11 Drawing Sheets

(56) References Cited

U.S. PATENT DOCUMENTS

| | | | | |
|---|---|---|---|---|
| 6,125,762 A | * | 10/2000 | Fritz | F42B 15/38 102/378 |
| 6,298,786 B1 | * | 10/2001 | Grosskrueger | F42B 15/38 102/377 |
| 8,070,105 B2 | * | 12/2011 | Johnson | B64G 1/12 244/158.3 |
| 8,186,625 B2 | | 5/2012 | de Jong | |
| 8,607,706 B2 | * | 12/2013 | Kister | F42B 15/38 102/378 |
| 8,695,473 B2 | * | 4/2014 | Kametz | F42B 15/38 89/1.14 |
| 8,776,661 B2 | * | 7/2014 | Cousin | B64G 1/645 89/1.14 |
| 9,027,481 B2 | * | 5/2015 | Kister | B64G 1/645 102/378 |
| 9,062,946 B2 | * | 6/2015 | Cousin | F42B 15/38 |
| 2005/0108950 A1 | | 5/2005 | Bigelow et al. | |
| 2009/0002257 A1 | | 1/2009 | de Jong et al. | |
| 2013/0236234 A1 | * | 9/2013 | Kaczynski | B64G 1/645 403/2 |
| 2016/0341362 A1 | | 11/2016 | Vuillamy et al. | |
| 2017/0037911 A1 | * | 2/2017 | Le Ru | F16D 9/10 |

\* cited by examiner

THERMALLY ISOLATING JOINT ASSEMBLY IN A SPACE VEHICLE

PRIORITY CLAIM

This application claims the benefit of priority to U.S. Provisional Patent Application No. 62/501,599, filed May 4, 2017 and entitled "THERMALLY ISOLATING JOINT ASSEMBLY IN A SPACE VEHICLE," which is hereby incorporated by reference in its entirety and for all purposes.

STATEMENT REGARDING FEDERALLY SPONSORED RESEARCH OR DEVELOPMENT

Some embodiments of this invention were made with United States Government Support under Contract No. NNX16CJ21P awarded by the National Aeronautics and Space Administration (NASA). The U.S. Government has certain rights in this invention.

TECHNICAL FIELD

This disclosure relates to joint assembly systems and apparatuses that structurally connect and thermally isolate a first structure from a second structure in a space vehicle and, more particularly, to joint assembly systems and apparatuses that structurally connect and thermally isolate a payload from cryogenic fuel tanks in a space vehicle.

BACKGROUND

Launch vehicles are generally used to launch payloads, such as satellites or scientific equipment, from the Earth's surface into space. Launch vehicles may include one or more rocket engines designed to fire at different times, or with different stages, as the launch vehicle travels from the Earth's surface into orbit. The different stages are fired sequentially and typically include at least a "booster" stage and an "upper" stage. The booster stage launches and delivers the payload a predetermined distance above the Earth before exhaustion. Upon exhaustion, the booster stage and the upper stage may separate, whereupon the upper stage is fired to transport the payload while in orbit. Both the booster stage and the upper stage utilize propellant to deliver the payload.

After launch and separation from the booster stage, the launch vehicle becomes an orbital vehicle that may require a large quantity of propellant to perform a mission. In one example, the large quantity of propellant may be used for deep space exploration, such as a mission to the moon, Mars, or beyond. In another example, the large quantity of propellant may be used to allow the payload to loiter for a longer duration of time in low-Earth orbit (LEO). In another example, the large quantity of propellant may be used for storage in an on-orbit depot while utilizing the services of the attached upper stage.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus. The apparatus includes a primary joint system between a first structure and a second structure, where the primary joint system is configured to disconnect to separate the first structure from the second structure. The apparatus further includes a secondary joint system adjacent to and connected to the primary joint system, where the secondary joint system is configured to maintain structural connection between the first structure and the second structure when the primary joint system is disconnected. The secondary joint system includes at least one inflatable annulus structure and at least one restraining member, where each of the at least one inflatable annulus structure and the at least one restraining member is thermally insulating.

In some implementations, the at least one inflatable annulus structure is in compression and the at least one restraining member is in tension to constrain the at least one inflatable annulus structure when the primary joint system is disconnected. In some implementations, the at least one inflatable annulus structure occupies an increased volume upon the primary joint system being disconnected. In some implementations, each inflatable annulus structure includes a barrier membrane and a plurality of tendons disposed around a tubular body of the barrier membrane. The plurality of tendons may be configured to substantially bear global pressure loads induced on the secondary joint system. In some implementations, the first structure includes a payload of a space vehicle and the second structure includes a cryogenic fuel tank of the space vehicle. In some implementations, the at least one inflatable annulus structure includes two or more inflatable annulus structures in contact with one another. In some implementations, the primary joint system includes a frangible joint connection. The primary joint system may further include one or more expandable tube assemblies configured to be expanded to cause breakage of the frangible joint connection. In some implementations, the at least one inflatable annulus structure includes a first material having a low thermal conductivity and the at least one restraining member includes a second material having a low thermal conductivity.

Another innovative aspect of the subject matter described in this disclosure can be implemented in a space vehicle. The space vehicle includes a payload section housing a payload, a cryogenic fuel tank, and a thermally conductive body connected to the cryogenic fuel tank, where the thermally conductive body is connected between the cryogenic tank and the payload section. The space vehicle further includes a joint assembly integrated at a position along the thermally conductive body, where the joint assembly includes a primary joint between a forward portion and an aft portion of the thermally conductive body, and a secondary joint adjacent to and connected to the primary joint. The primary joint is configured to disconnect and form a gap between the forward portion and the aft portion of the thermally conductive body, and the secondary joint is configured to maintain structural connection between the forward portion and the aft portion of the thermally conductive body when the primary joint is disconnected.

In some implementations, the secondary joint includes at least one inflatable annulus structure with a tubular body configured to exert increased compression on the secondary joint when the primary joint is disconnected, and at least one restraining member constraining the at least one inflatable annulus structure when the primary joint is disconnected. The tubular body may include a barrier membrane and each inflatable annulus structure includes a plurality of tendons disposed around the tubular body of the barrier membrane. In some implementations, the forward portion has a higher temperature than the aft portion of the thermally conductive body.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Introduction

A space vehicle may include an orbital vehicle after launch, where the orbital vehicle may require a large amount of propellant to perform a mission. The orbital vehicle includes an upper stage that stores propellant and a conventional payload. Cryogenic propellants, such as liquid oxygen (LOX) and liquid hydrogen (LH2), may serve as ideal upper stage propellants because of their high specific impulse. However, cryogenic propellants require storage at very low temperatures in order to maintain them in a liquid state. Otherwise, the cryogenic propellants boil off and are wastefully vented into space. A load-bearing section that includes a conventional payload can be warmer than an energy storage section that includes the cryogenic propellant. Heat transfer can occur between the load-bearing section and the energy storage section, particularly with thermally conductive materials connecting the two sections. This can increase the temperature in storage tanks of the cryogenic propellant, which can result in boil-off of the cryogenic propellant and ultimately limit the on-orbit useful life of the upper stage.

Figure 1:
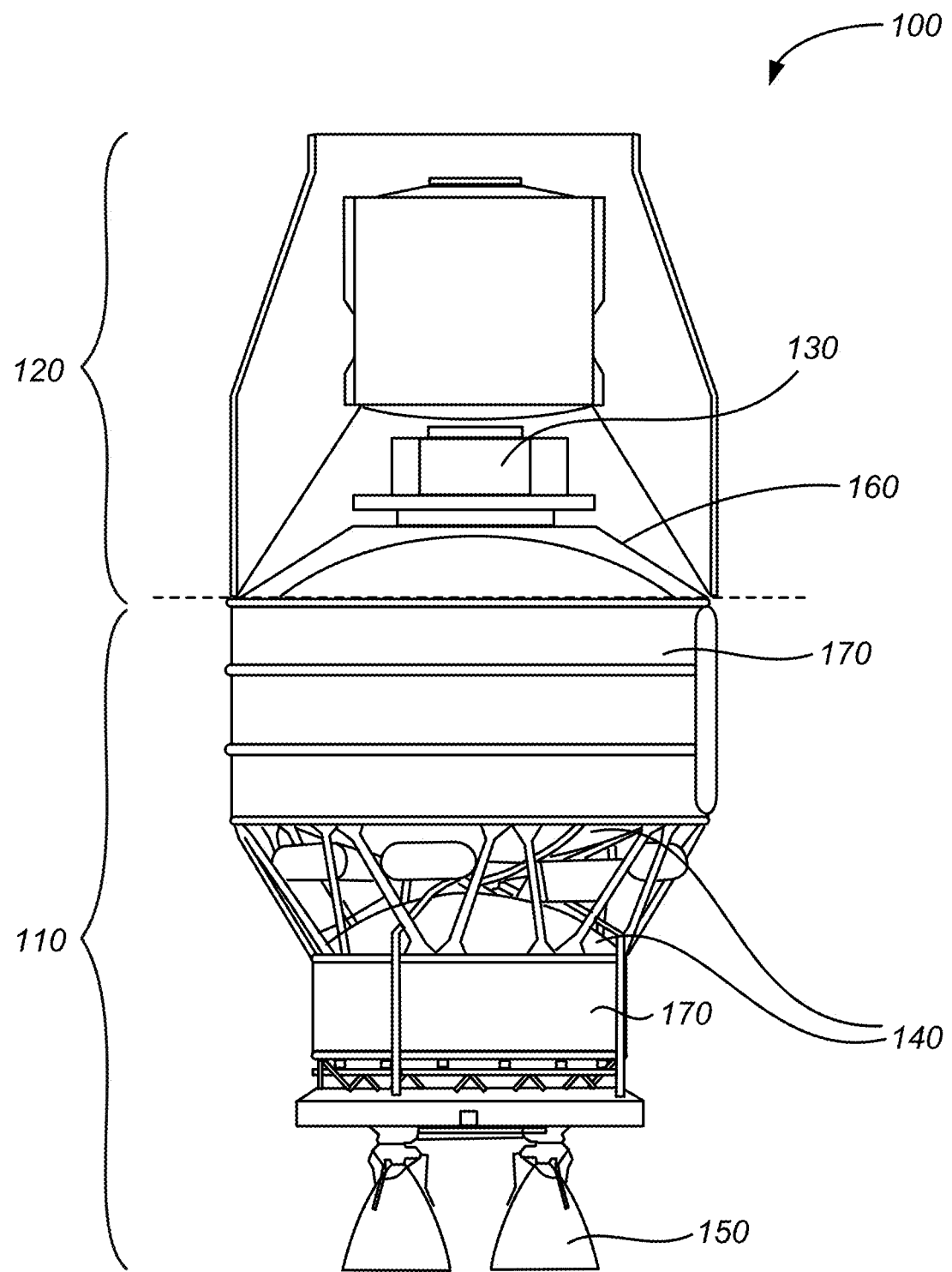
FIG. 1 shows a schematic diagram of an example space vehicle including a payload or load-bearing section and an upper stage.

FIG. 1 shows a schematic diagram of an example space vehicle with a payload or load-bearing section and an upper stage. Prior to launch of the space vehicle 100 into orbit, the space vehicle 100 may include multiple stages, including a booster stage (not shown) and an upper stage 110. A payload section 120 configured to carry a payload 130 is connected to the upper stage 110 of the space vehicle 100. The upper stage 110 may also be referred to as an energy storage section. After the space vehicle 100 is launched into orbit, the booster stage separates from the upper stage 110. The upper stage 110 includes one or more propellant tanks 140, where the one or more propellant tanks 140 may be connected to one or more rocket engines 150. The rocket engines 150 are fueled by the propellant tanks 140 to handle propulsion of the designated payload 130. In some implementations, the propellant tanks 140 may store one or both of liquid hydrogen and liquid oxygen. A barrel may form a cylindrical portion of a propellant tank 140. Liquid oxygen may be stored in an aft section of the upper stage 110 and exposed to the rocket engines 150, and liquid hydrogen may be stored in a forward section of the upper stage 110.

A shell 170 may be outside of at least one of the propellant tanks 140. The shell 170 may serve as an intermediate to connect the upper stage 110 to the payload section 120, and may provide a load path to the payload section 120. The shell 170 may be provided on either side of the barrel of the propellant tanks 140. As used herein, the shell 170 may also be referred to as a "skirt."

A payload adapter 160 may connect to the shell 170 and may further serve as an intermediate structure to connect the upper stage 110 to the payload section 120. As used herein, the payload adapter 160 may also be referred to as a "payload attach fitting." The payload adapter 160 and the shell 170 may be made of composite materials rather than metal materials to limit thermal conduction between the payload structure 120 and the upper stage 110. However, such composite materials may require expensive tooling, may increase design complexity, and may not be compatible with zero boil-off solutions. Using a thermally conductive material, such as metal, for the shell 170 and the payload adapter 160 can provide a more durable and less expensive solution.

Figure 2A:
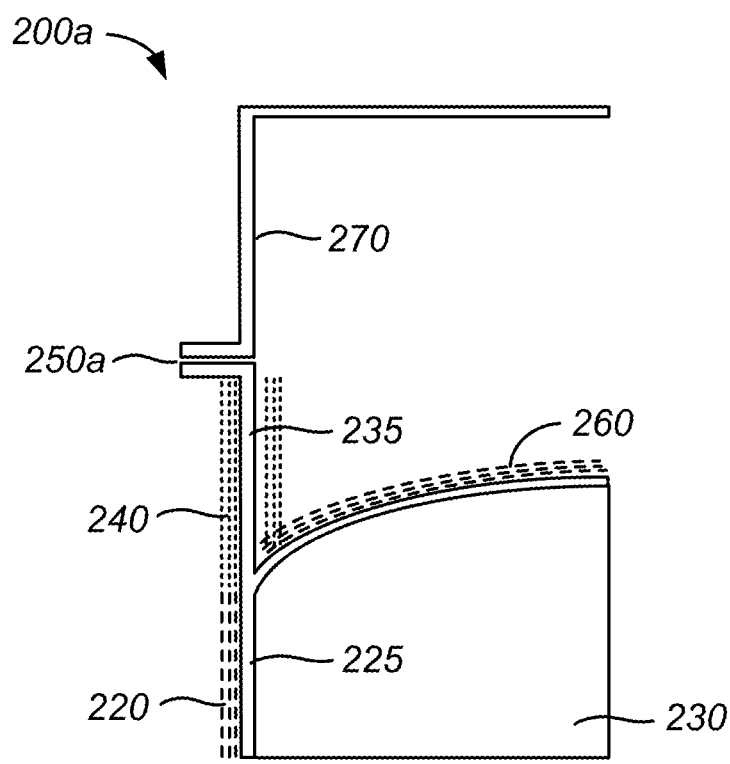
FIG. 2A shows a cross-sectional schematic diagram of a structural interconnection between a payload section and an energy storage section in an example space vehicle.

FIG. 2A shows a cross-sectional schematic diagram of a structural interconnection between a payload section and an energy storage section in an example space vehicle. A space vehicle 200a can include an energy storage section with a cryogenic fuel tank 230 containing a liquid propellant, such as liquid oxygen or liquid hydrogen. The cryogenic fuel tank 230 is maintained at a very low temperature, such as below about 110 K, below about 90 K, or between about 0 K and about 90 K, in order to maintain the liquid propellant in a liquid state.

Walls of the cryogenic fuel tank 230 may be enclosed or protected by one or more panels 220, 240, and 260. The panels 220, 240, and 260 may be formed as a single piece or a plurality of segments. The panels 220, 240, and 260 may be insulating. One or more of the panels 220, 240, and 260 may provide self-support against aerodynamic loads. In some implementations, one of the panels includes a barrel insulation 220 connected to a skirt insulation 240, where the barrel insulation 220 and the skirt insulation 240 form a part of the outer surface of the space vehicle 200a. The barrel insulation 220 and the skirt insulation 240 may receive heat from the environment by radiation and conduction, and heat flux along a skirt 235 is designed to maintain a desired temperature differential. In some implementations, one of the insulating panels includes a dome section 260 enclosing or positioned over an upper portion of the cryogenic fuel tank 230. The barrel insulation 220, skirt insulation 240, and the dome section 260 may be configured to maintain a desired temperature differential to limit heating of the cryogenic fuel tank 230.

The space vehicle 200a can include a payload section 270. The payload section 270 is generally much warmer than a cryogenic fuel tank 230. Whereas a cryogenic fuel tank 230 may be designed to maintain a temperature less than about 110 K, less than about 90 K, or between about 0 K and about 90K, a payload section 270 may be designed to maintain a temperature greater than about 150 K, greater than about 200 K, greater than about 220 K, between about 150 K and about 400 K, or between about 220 K and about 300 K. A skirt 235 and/or a barrel 225 may be connected to one or more walls of the cryogenic fuel tank 230. In some implementations, skirt insulation 240 and barrel insulation 240 may cover the skirt 235 and barrel 225 of the cryogenic fuel tank 230 of the space vehicle 200a, respectively. Typically, as shown in the space vehicle 200a in FIG. 2A, the payload section 270 may form an interface 250a with the skirt 235. The interface 250a may form a thermally conductive connection between the payload section 270 and the skirt 235. In some implementations, for example, the interface 250a between the payload section 270 and the skirt 235 can be bolted, clamped, attached, or otherwise joined. As a result, heat flux may transfer from the payload section 270 to heat the cryogenic fuel tank 230. The heat can cause boil-off of cryogenic propellant in the cryogenic fuel tank 230.

Figure 2B:
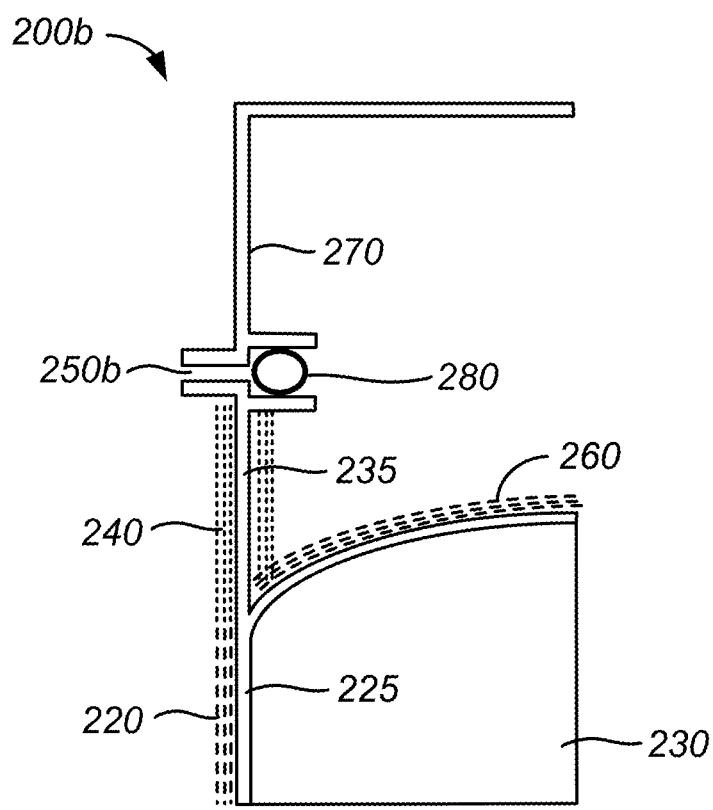
FIG. 2B shows a cross-sectional schematic diagram of a structural interconnection with a thermally isolating joint assembly between a payload section and ab energy storage section in an example space vehicle.

FIG. 2B shows a cross-sectional schematic diagram of a structural interconnection with a thermally isolating joint assembly between a payload section and an energy storage section in an example space vehicle. Like the space vehicle 200a in FIG. 2A, the space vehicle 200b in FIG. 2B similarly includes an energy storage section with a cryogenic fuel tank 230, skirt 235, barrel 225, payload section 270, and panels 220, 240, and 260. Aspects of the cryogenic fuel tank 230, skirt 235, barrel 225, payload section 270, and panels 220, 240, and 260 are described with respect to the space vehicle 200a in FIG. 2A. However, rather than forming a thermally conductive interface 250a between the payload section 270 and the skirt 235, the space vehicle 200b in FIG. 2B includes a thermally non-conductive interface 250b between the payload section 270 and the skirt 235. The thermally non-conductive interface 250b includes a thermally isolating joint assembly 280, where the thermally isolating joint assembly 280 provides structural interconnection between the payload section 270 and the cryogenic fuel tank 230 while thermally isolating the two sections. In other words, the thermally isolating joint assembly 280 provides an insulative yet structural connection between an upper stage and the load-bearing section. That way, heat flux does not transfer or only negligibly transfers from the payload section 270 to the cryogenic fuel tank 230. As a result, the cryogenic fuel tank 230 can remain at a very low temperature. The thermally non-conductive interface 250b includes an interface (e.g., joint) as shown in FIG. 2A for launch loads, but FIG. 2B reconfigures the interface (e.g., joint) so as to reduce thermal loads and is exposed to reduced structural loads on orbit. Additional details regarding the thermally non-conductive interface 250b and the thermally isolating joint assembly 280 are described below.

Thermally Isolating Joint Assembly

The joint assembly of the present disclosure can be positioned between an upper stage and a load-bearing section of a space vehicle, where the joint assembly provides insulative yet structural connection between the upper stage and the load-bearing section. The joint assembly can include at least two joints, where a primary joint is configured to separate at a time after launching the space vehicle, and where a secondary joint includes an inflatable annulus structure and one or more restraining members. Upon separation of the primary joint, the inflatable annulus structure may be in compression and the one or more restraining members may be in tension to form a rigid structure. Just as a skirt, shell, or barrel of the space vehicle is annularly arranged around an upper stage of the space vehicle, the joint assembly may be positioned along the skirt, shell, or barrel and may also be annularly arranged around the upper stage of the space vehicle.

Figure 3A:
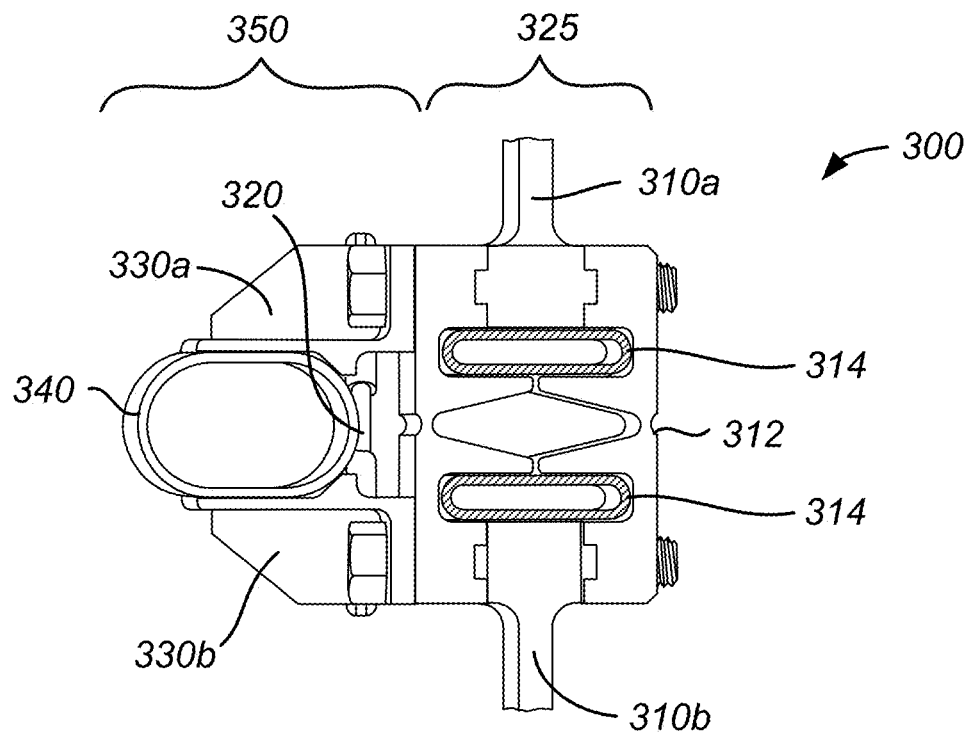
FIG. 3A shows a side view of an example joint assembly including a primary joint and a secondary joint with an inflatable annulus structure in a stowed position.

FIG. 3A shows a side view of an example joint assembly including a primary joint and a secondary joint with an inflatable annulus structure in a stowed position. A joint assembly 300 shown in FIG. 3A is in a stowed position. The joint assembly 300 includes a primary joint 325 and a secondary joint 350, where the secondary joint 350 is adjacent to and connected to the primary joint 325. The primary joint 325 is configured to disconnect or separate, where the primary joint 325 may separate between an upper section 310a and a lower section 310b. A person having ordinary skill in the art will readily appreciate, the terms "upper" and "lower" as described herein are used for ease of describing the figures, and may simply indicate relative positions corresponding to the orientation of a figure on a properly oriented page, and may not reflect the proper orientation as implemented in an apparatus. In some implementations, the primary joint 325 may separate at a frangible joint connection 312. In some implementations, the upper section 310a may be connected to a portion of a skirt that is connected to a load-bearing section of a space vehicle, and the lower section 310b may be connected to a portion of the skirt that is connected to a cryogenic fuel tank. In some implementations, the upper section 310a may be referred to as a first structure that includes a payload of the space vehicle, and the lower section 310b may be referred to as a second structure that includes a cryogenic fuel tank of the space vehicle. In some implementations, the upper section 310a may represent connection to the payload section of a space vehicle and lower section 310b may represent connection to the upper stage of the space vehicle. The primary joint 325 may be made of or a bulk of the primary joint 325 can include a thermally conductive material, such as a metal. In some implementations, a bulk of the primary joint 325 is made of aluminum.

In some implementations, the primary joint 325 can include one or more expandable tube assemblies 314. The one or more expandable tube assemblies 314 are recessed within the primary joint 325. Each of the expandable tube assemblies 314 include a tube that is capable of expanding and exerting pressure on portions of the primary joint 325, including the frangible joint connection 312. Enough pressure may be exerted upon expansion of the tube to fracture the frangible joint connection 312 and cause the frangible joint connection 312 disconnect the primary joint 325 between the upper section 310a and the lower section 310b.

Adjacent to and connected to the primary joint 325, the secondary joint 350 includes an inflatable annulus structure 340 and a restraining member 320. The inflatable annulus structure 340 includes a material that is thermally insulating, and the restraining member 320 includes a material that is also thermally insulating. When the inflatable annulus structure 340 is deployed, the restraining member 320 is tensioned in the secondary joint 350. In some implementations, the restraining member 320 can include a tension strap, tendon, cord, or other component made of a flexible material. For example, such a flexible material can include Vectran®. The restraining member 320 may be mechanically coupled with the upper section 310a and the lower section 310b of the primary joint 325 so that separation of the upper section 310a from the lower section 310b increases tension in the restraining member 320. As shown in FIG. 3A, the secondary joint 350 further includes a first shelf 330a and a second shelf 330b, where the inflatable annulus structure 340 is disposed between a first shelf 330a and a second shelf 330b of the secondary joint 350. The restraining member 320 connects the first shelf 330a with the second shelf 330b. The first shelf 330a and the second shelf 330b are connected to the primary joint system 325, where the first shelf 330a is connected to the upper section 310a and the second shelf 330b is connected to the lower section 310b. In some implementations, the first shelf 330a and the second shelf 330b includes a material that is thermally conductive, such as a metal.

Figure 3B:
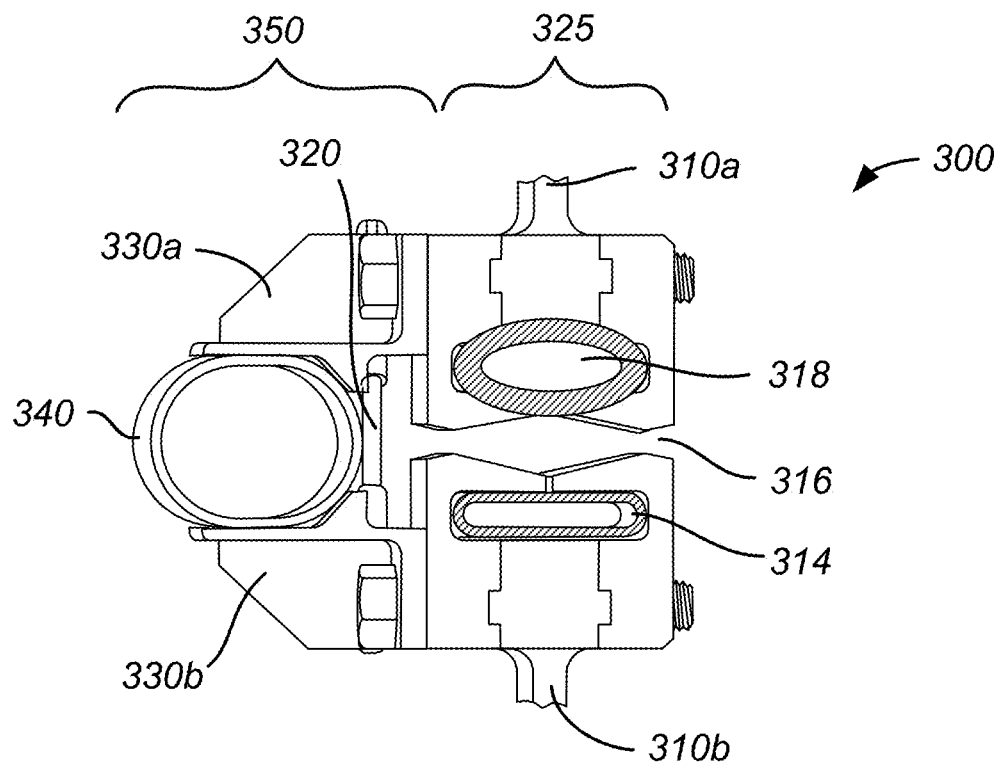
FIG. 3B shows a side view of the example joint assembly of FIG. 3A in a deployed position.
Figure 3C:
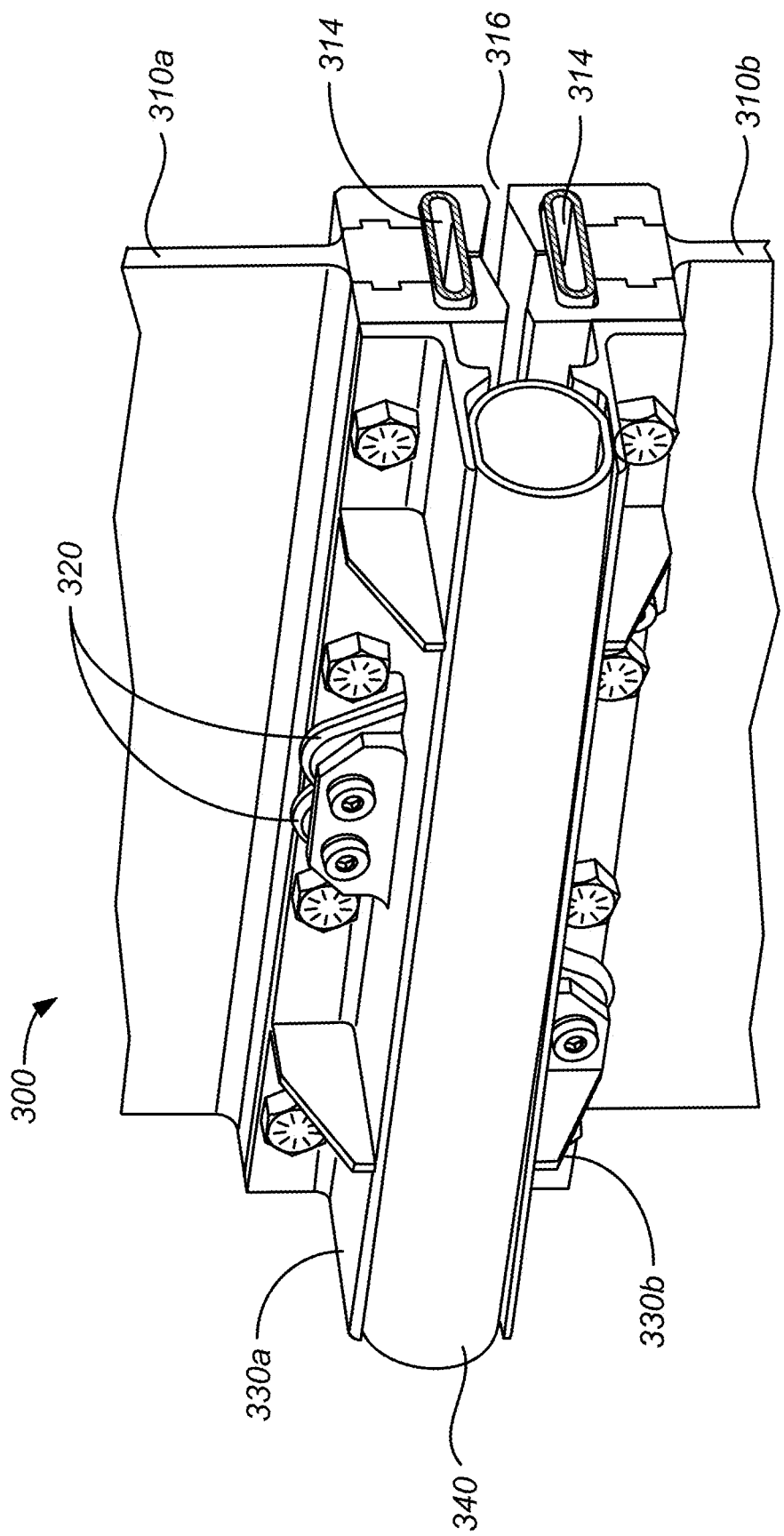
FIG. 3C shows a perspective view of the example joint assembly of FIG. 3B in a deployed position.

FIG. 3B shows a side view of the example joint assembly of FIG. 3A in a deployed position. FIG. 3C shows a perspective view of the example joint assembly of FIG. 3B in a deployed position. At a certain time following launch of the space vehicle, the upper section 310a may separate from lower section 310b of the primary joint 325. Separation of the upper section 310a from the lower section 310b forms a gap 316 between the upper section 310a and the lower section 310b. Ordinarily, separation of the upper section 310a from the lower section 310b causes separation of different stages of a space vehicle at different times. In FIG. 3B, a gap 316 is formed but the joint assembly 300 maintains structural connection between the upper section 310a and the lower section 310b via the secondary joint 350.

Separation may be initiated by expansion of at least one of the expandable tube assemblies 314. In some implementations, actuation gas is released to cause expansion of at least one of the expandable tube assemblies 314. A sufficiently expanded tube assembly 318 exerts pressure on the frangible joint connection 312 to sever the frangible joint connection 312 to form a gap 316 between the upper section 310a and the lower section 310b. In some implementations, the frangible joint connection 312 can be made of a brittle material, such as aluminum. The separation of the primary joint 325 eliminates a thermal path by which heat flux is transferred from the upper section 310a to the lower section 310b.

Separation or disconnection of the primary joint 325 causes the secondary joint 350 to go from a stowed position to a deployed position. However, it will be understood that the secondary joint 350 may enter a deployed position at other appropriate times aside from when separation of the primary joint 325 occurs, such as before or after launch of a space vehicle. The inflatable annulus structure 340 occupies a first volume in the stowed position in FIG. 3A and occupies a second volume greater than the first volume in the deployed position in FIG. 3B. In the stowed position, a shape of the cross-section of the inflatable annulus structure 340 occupies a certain volume and changes in the deployed position. The shape of the cross-section changes due to changes in loading exerted on the inflatable annulus structure 340. The inflatable annulus structure 340 is in compression while the restraining member 320 is in tension. In some implementations, the inflatable annulus structure 340 is in compression against the first shelf 330a and the second shelf 330b, and the restraining member 320 in tension creates rigidity in the secondary joint 350. In other words, the inflatable annulus structure 340 pushes apart the first shelf 330a and the second shelf 330b but is constrained by the restraining member 320. The restraining member 320 may serve to accommodate expansion or cross-sectional shape changes of the inflatable annulus structure 340. Rigidity in the secondary joint 350 provides adequate structural connection between the upper section 310a and the lower section 310b so that various orbital maneuvers can be performed by the space vehicle. Moreover, the structural connection between the upper section 310a and the lower section 310b is thermally isolating because materials of the inflatable annulus structure 340 and the restraining member 320 have very low thermal conductivity. In some implementations, each of the inflatable annulus structure 340 and the restraining member 320 has a thermal conductivity of equal to or less than about 1.0 W/m–K, equal to or less than about 0.5 W/m–K, equal to or less than about 0.2 W/m–K, equal to or less than about 0.1 W/m–K, between about 0.001 W/m–K and about 1.0 W/m–K, or between about 0.002 W/m–K and about 0.2 W/m–K under standard atmospheric pressure and temperature.

Figure 4A:
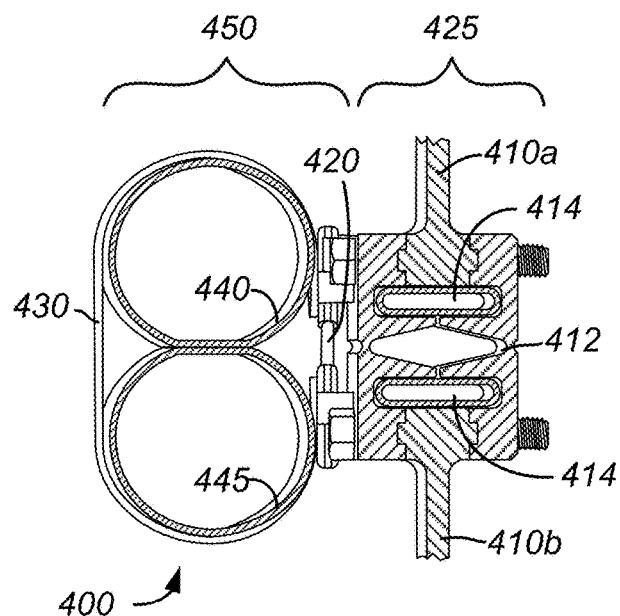
FIG. 4A shows a side view of an example joint assembly including a primary joint and a secondary joint with two inflatable annulus structures.
Figure 4B:
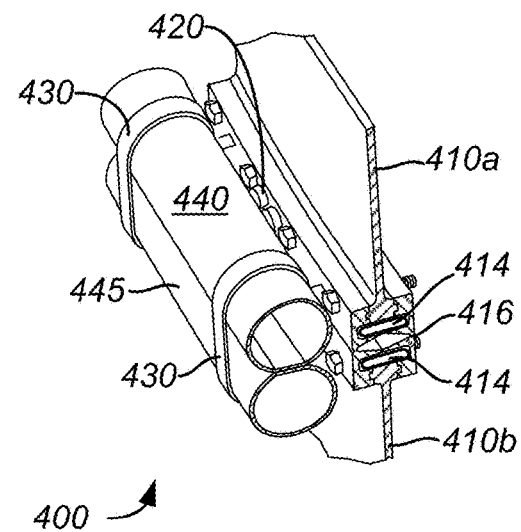
FIG. 4B shows a perspective view of the example joint assembly of FIG. 4A.
Figure 4C:
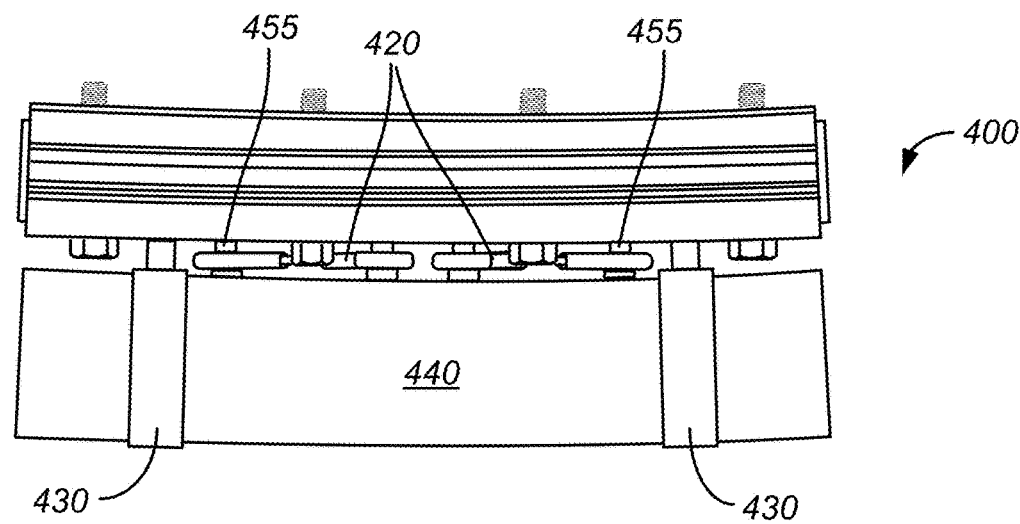
FIG. 4C shows a top view of the example joint assembly of FIGS. 4A and 4B.

FIG. 4A shows a side view of an example joint assembly including a primary joint and a secondary joint with two inflatable annulus structures. FIG. 4B shows a perspective view of the example joint assembly of FIG. 4A. FIG. 4C shows a top view of the example joint assembly of FIGS. 4A and 4B.

Like the joint assembly 300 in FIGS. 3A-3C, the joint assembly 400 in FIGS. 4A-4C includes a primary joint 425 and a secondary joint 450, where the secondary join 450 is adjacent to and connected to the primary joint 425. Rather than a single inflatable annulus structure compressed between shelves, the secondary joint 450 in the joint assembly 400 includes at least two inflatable annulus structures 440, 445 in contact with one another and held in compression by straps 430. In some implementations, the at least two inflatable annulus structures 440, 445 may be vertically stacked on top of one another. One or more straps 430 can wrap around or at least partially wrap around tubular bodies of the inflatable annulus structures 440, 445 to hold the inflatable annulus structures 440, 445 in place. Without shelves in the joint assembly 400, the joint assembly 400 in FIGS. 4A-4C can have a reduced mass relative to the joint assembly 300 in FIGS. 3A-3C.

Like the joint assembly 300 in FIGS. 3A-3C, the joint assembly 400 in FIGS. 4A-4C includes a primary joint 425. The primary joint 425 is configured to be separable at a frangible joint connection 412. The primary joint 425 includes an upper section 410a and a lower section 410b, where separation at the frangible joint connection 412 separates the upper section 410a from the lower section 410b in the primary joint 425. More specifically, a thermal path between the upper section 410a and the lower section 410b is eliminated. At a certain time following launch of the space vehicle, the upper section 410a may separate from lower section 410b of the primary joint 425. In some implementations, the upper section 410a may be connected to a portion of a skirt that is connected to a load-bearing section of a space vehicle, and the lower section 410b may be connected to a portion of the skirt that is connected to a cryogenic fuel tank. In some implementations, the upper section 410a may be referred to as a first structure that includes a payload of the space vehicle, and the lower section 410b may be referred to as a second structure that includes a cryogenic fuel tank of the space vehicle. The primary joint 425 further includes one or more expandable tube assemblies 414 recessed within the primary joint 425, where expansion of the expandable tube assemblies 414 can generate sufficient pressure within the primary joint 425 to break the frangible joint connection 412. In some implementations, the primary joint 425 including the frangible joint connection 412, the upper section 410a, and the lower section 410b includes a material that is thermally conductive, such as a metal (e.g., aluminum). However, despite separation in the primary joint 425, the upper section 410a maintains structural connection with the lower section 410b via the secondary joint 450.

The secondary joint 450 further includes a restraining member 420. When the at least two inflatable annulus structures 440, 445 are deployed upon separation of the primary joint 425, the restraining member 420 is tensioned in the secondary joint 450. However, it will be understood that the at least two inflatable annulus structures 440, 445 may be deployed at other appropriate times aside from separation of the primary joint 425, such as before or after launch of a space vehicle. In some implementations, the restraining member 420 can include a tension strap, tendon, cord, or other component made of a flexible material. For example, such a flexible material can include Vectran®. The restraining member 420 may be mechanically coupled with the upper section 410a and the lower section 410b of the primary joint 425 so that separation of the upper section 410a from the lower section 410b increases tension in the restraining member 420. In some implementations, the restraining member 420 is connected to the upper section 410a and the lower section 410b via connecting members 455 extending from a side of the primary joint 425. In some implementations, the secondary joint 450 including the inflatable annulus structures 440, 445, the one or more straps 430, and the restraining member 420 includes a material that is thermally insulating.

Separation or disconnection of the primary joint 425 causes the secondary joint 450 to go from a stowed position to a deployed position. However, the joint assembly 400 maintains structural connection between the upper section 410a and the lower section 410b via the secondary joint 450. Each of the inflatable annulus structures 440, 445 occupies a first volume in the stowed position and occupies a second volume greater than the first volume in the deployed position. In the stowed position, a shape of the cross-section of the inflatable annulus structures 440, 445 occupies a certain volume and changes in the deployed position. The shape of the cross-section changes due to changes in loading exerted on the inflatable annulus structures 440, 445. The at least two inflatable annulus structures 440, 445 are in compression while the restraining member 420 is in tension, where the at least two inflatable annulus structures 440, 445 are in compression against the straps 430 to create rigidity in the secondary joint 450. The restraining member 420 may serve to accommodate expansion or cross-sectional shape changes of the at least two inflatable annulus structures 440, 450. Rigidity in the secondary joint 450 provides adequate structural connection between the upper section 410a and the lower section 410b so that various orbital maneuvers can be performed by the space vehicle. The structural connection between the upper section 410a and the lower section 410b is thermally isolating because materials of the at least two inflatable annulus structures 440, 445 and the restraining member 420 have very low thermal conductivity. In some implementations, each of the at least two inflatable annulus structures 440, 445 and the restraining member 420 has a thermal conductivity of equal to or less than about 1.0 W/m–K, equal to or less than about 0.5 W/m–K, equal to or less than about 0.2 W/m–K, equal to or less than about 0.1 W/m–K, between about 0.001 W/m–K and about 1.0 W/m–K, or between about 0.002 W/m–K and about 0.2 W/m–K under standard atmospheric pressure and temperature.

Figure 5A:
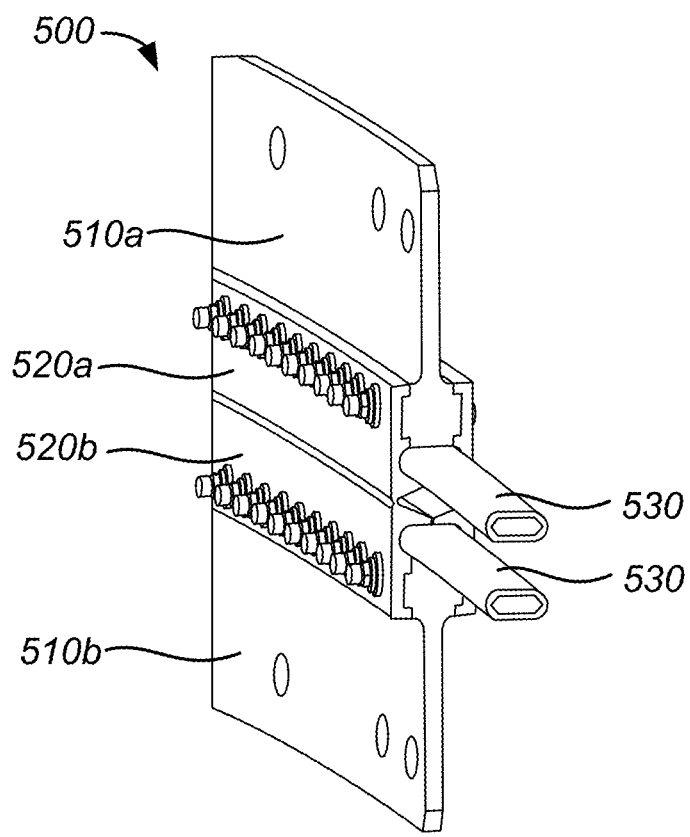
FIG. 5A shows a perspective view of an example primary joint.
Figure 5B:
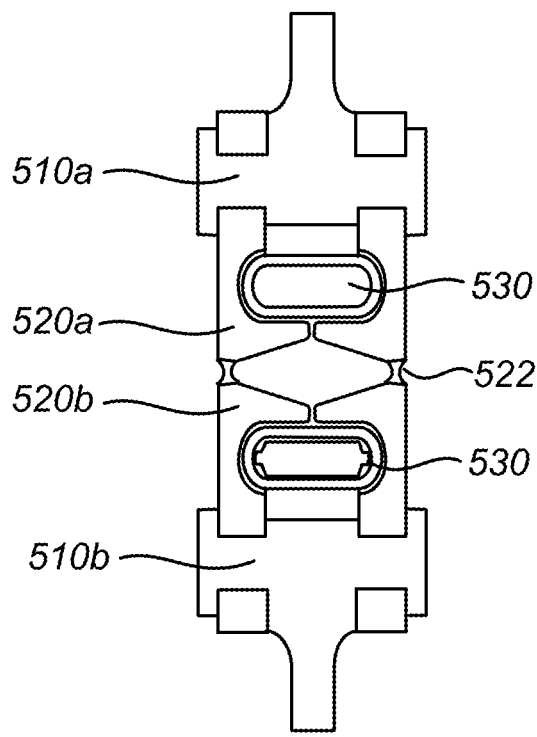
FIG. 5B shows a cross-sectional side view of the example primary joint of FIG. 5A in an unseparated position.
Figure 5C:
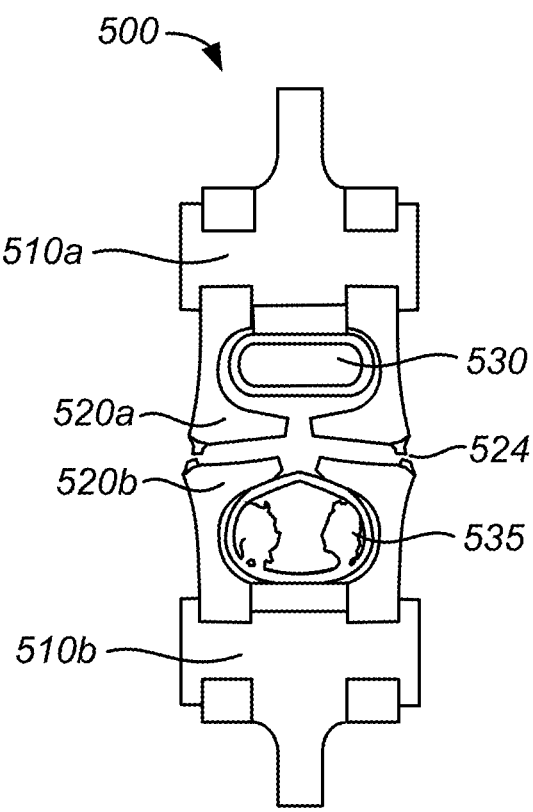
FIG. 5C shows a cross-sectional side view of the example primary joint of FIG. 5A in a separated position.

FIG. 5A shows a perspective view of an example primary joint. FIG. 5B shows a cross-sectional side view of the example primary joint of FIG. 5A prior to separation. FIG. 5C shows a cross-sectional side view of the example primary joint of FIG. 5A after separation. A primary joint 500 can be capable of separating an upper section 510a from a lower section 510b during operation of a space vehicle. Prior to separation, a frangible joint connection 522 may connect the upper section 510a with the lower section 510b. After separation, the frangible joint connection 522 is broken or disconnected so that the upper section 510a is separated from the lower section 510b, thereby eliminating a thermal path between the upper section 510a and the lower section 510b. The primary joint 500 shown in FIGS. 5A-5C may be applied in the joint assembly 300 in FIGS. 3A-3C and the joint assembly 400 in FIGS. 4A-4C. Though the joint assembly 300 in FIGS. 3A-3C and the joint assembly 400 in FIGS. 4A-4C may include the primary joint 500 in FIGS. 5A-5C, it will be understood that other separable joint systems may be implemented as the primary joint, such as explosive bolt joints or clamp band joints.

The primary joint 500 includes one or more expandable tube assemblies 530 recessed in the primary joint 500. In some implementations, each of the expandable tube assemblies 530 is bounded within a pair of opposing plates 520a, 520b. The frangible joint connection 522 is located between the pair of opposing plates 520a, 520b. In some implementations, each of the frangible joint connection 522 and the opposing plates 520a, 520b may include a brittle material, such as aluminum.

Each of the expandable tube assemblies 530 may include an explosive cord located therein. In some implementations, each of the expandable tube assemblies 530 may include a silicone rubber or other pliable material. One of the explosive cords may explosively detonate and release actuation gas to cause one of the expandable tube assemblies 530 to expand. If that explosive cord fails to properly detonate or cause separation of the frangible joint connection 522, then another explosive cord may explosively detonate and release actuation gas to cause the other one of the expandable tube assemblies 530 to expand.

The frangible joint connection 522 forms a connection between the upper section 510a and the lower section 510b, where the frangible joint connection 522 can form a groove, channel, recess, or slot with a narrow amount of material separating the upper section 510a and the lower section 510b. Upon detonation of one of the explosive cords, one of the expandable tube assemblies 530 outwardly deforms to form an expanded tube assembly 535, which exerts pressure upon the frangible joint connection 522. This causes the frangible joint connection 522 to fracture and form a gap 524, resulting in separation of the upper section 510a from the lower section 510b. An example of a primary joint 500 that is capable of separation at a frangible joint connection 522 with one or more expandable tube assemblies 530 is manufactured by Ensign-Bickford Aerospace & Defense Company located in Simsbury, Conn.

Figure 6A:
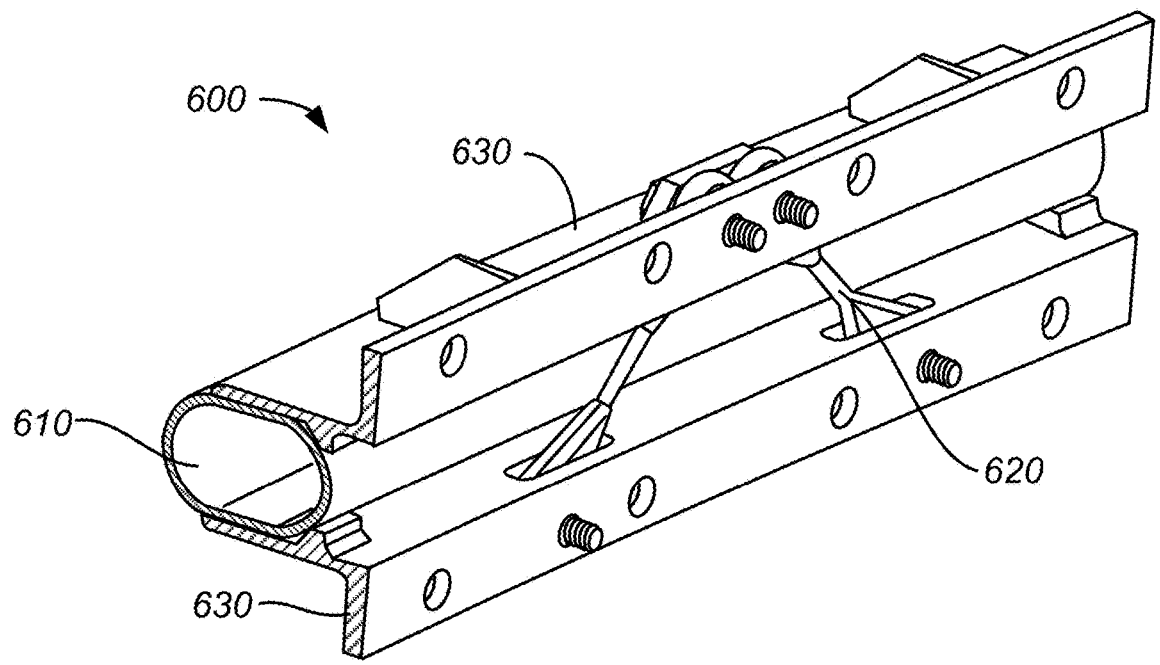
FIG. 6A shows a perspective view of an example secondary joint.
Figure 6B:
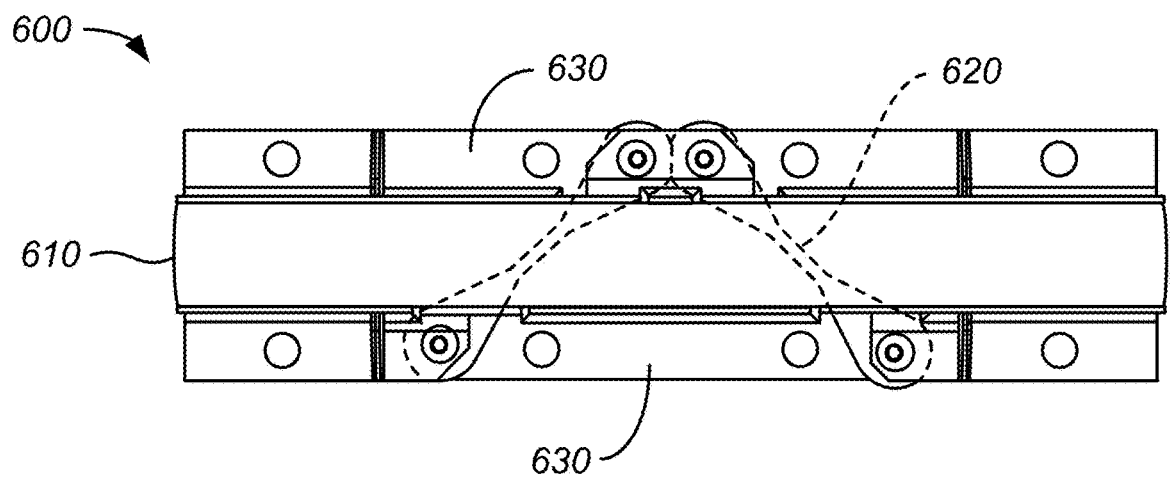
FIG. 6B shows a side view of the example secondary joint of FIG. 6A.

FIG. 6A shows a perspective view of an example secondary joint. FIG. 6B shows a side view of the example secondary joint of FIG. 6A. A secondary joint 600 can be connected to and adjacent to a primary joint that is capable of separating an upper section from a lower section, where the upper section provides structural connection to a payload section of a space vehicle and the lower section provides structural connection to an energy storage section of the space vehicle. The secondary joint 600 maintains structural interconnection between the upper section and the lower section despite separation of the primary joint. The secondary joint 600 comprises materials and structures that thermally isolate the upper section from the lower section. In some implementations, the secondary joint 600 comprises at least one inflatable annulus structure 610 and one or more restraining members 620. The one or more restraining members 620 are mechanically coupled with the primary joint such that the one or more restraining members are configured to tension upon separation of the primary joint. The secondary joint 600 shown in FIGS. 6A-6B may be applied in the joint assembly 300 in FIGS. 3A-3C.

The secondary joint 600 provides a rigid interconnection between an upper section and a lower section so that the space vehicle can perform various orbital maneuvers. The inflatable annulus structure 610 provides a high strength and light weight structurally determinate body that is capable of sustaining large compressive loads. The inflatable annulus structure 610 may include a tubular body, where the tubular body is configured to be circumferentially positioned about an upper stage of the space vehicle. As shown in FIGS. 6A and 6B, the inflatable annulus structure 610 may be positioned between shelves 630. The shelves 630 are configured to be connected to or otherwise attached to the primary joint. The one or more restraining members 620 provide a reaction force opposing the inflatable annulus structure 610 to form a rigid system. Thus, when the inflatable annulus structure 610 is in compression against the shelves 630 in a deployed state, the one or more restraining members 620 are in tension. The tubular body of the inflatable annulus structure 610 may increase in volume in the deployed state. The one or more restraining members 620 may be configured to accommodate axial, transverse, and moment loads exerted upon the secondary joint 600. In some implementations, each of the one or more restraining members 620 may be angled or diagonalized to accommodate axial, transverse, and moment loads induced on the secondary joint 600. Accordingly, the one or more restraining members 620 may resist accelerations and vibrations so that the secondary joint 600 provides rotational and lateral stability in the space vehicle during various orbital maneuvers.

Figure 7A:
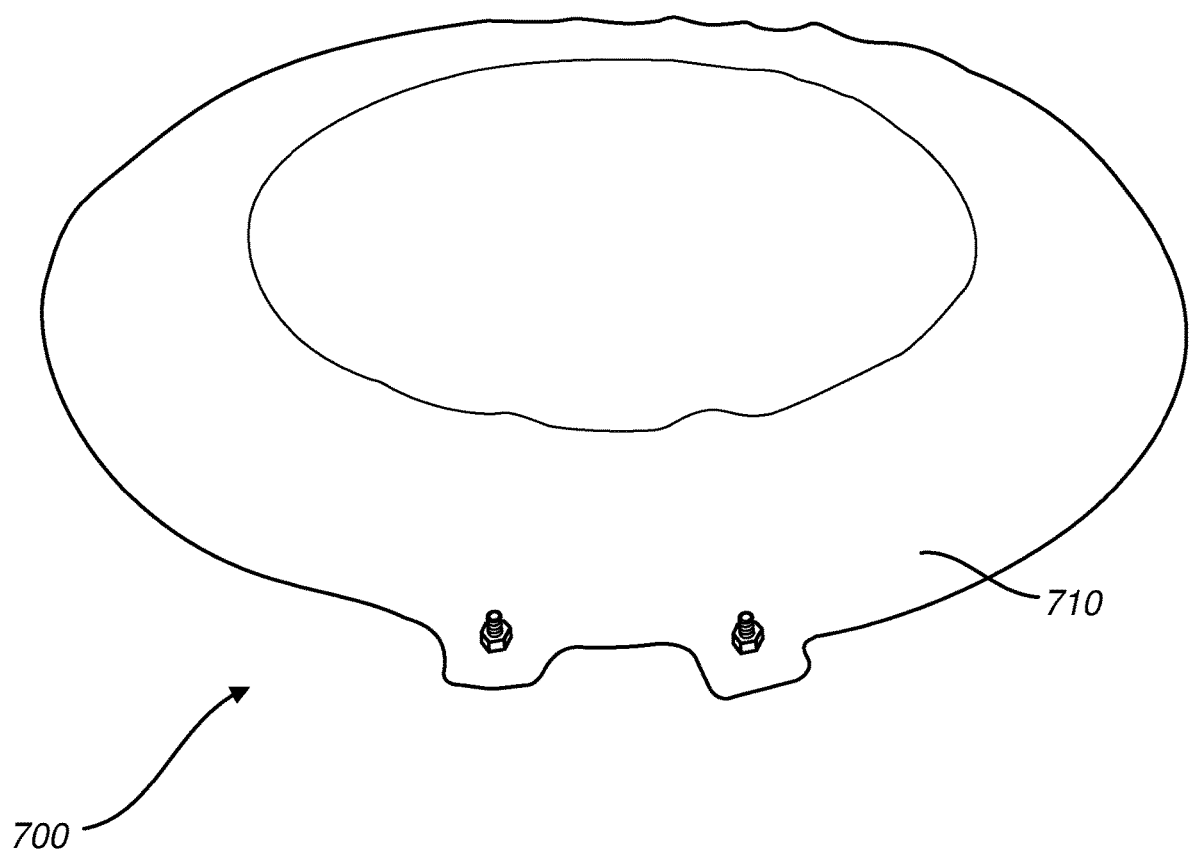
FIG. 7A shows an image of an inflatable annulus structure prior to inflation.
Figure 7B:
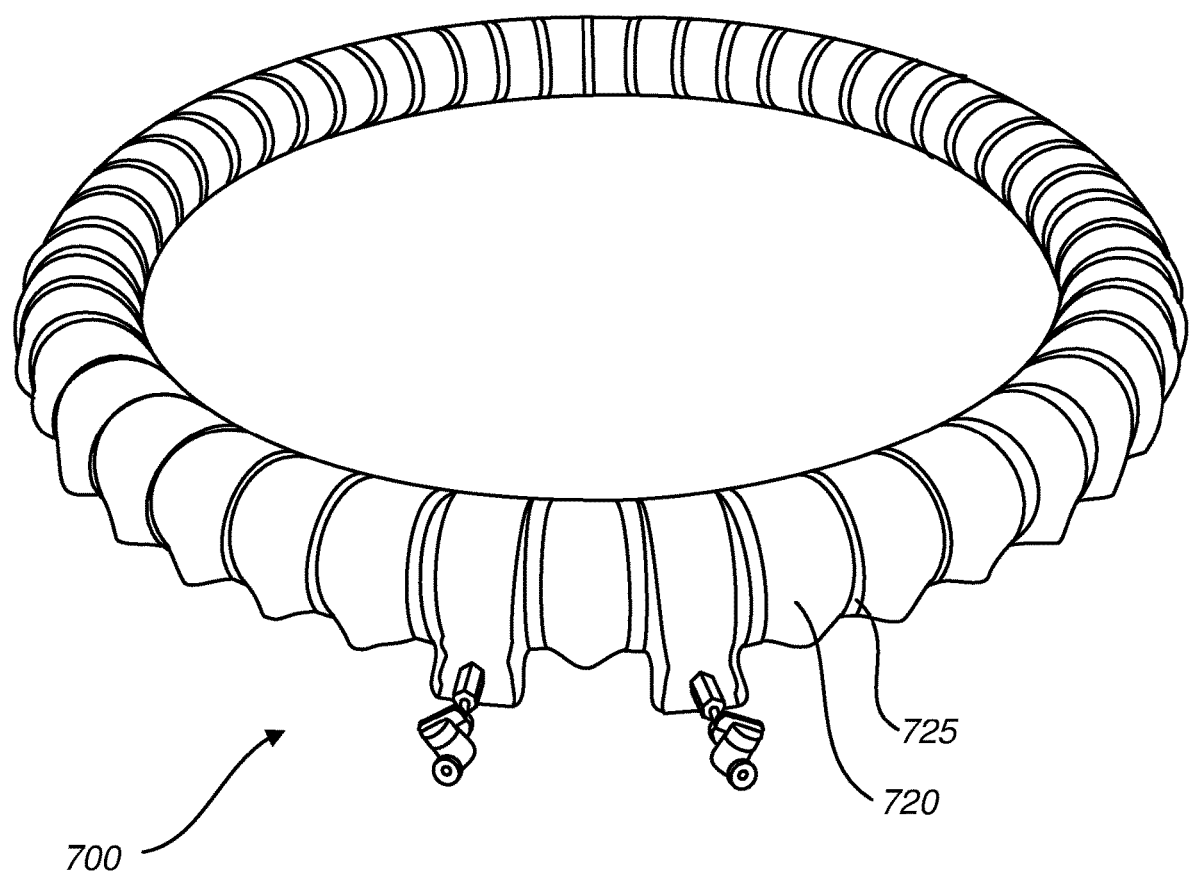
FIG. 7B shows an image of an inflatable annulus structure after inflation and having a plurality of tendons disposed around a tubular body of the inflatable annulus structure.

FIG. 7A shows an image of an inflatable annulus structure prior to inflation. FIG. 7B shows an image of an inflatable annulus structure after inflation and having a plurality of tendons disposed around a tubular body of the inflatable annulus structure. An inflatable annulus structure 700 can have an annular shape with an inner diameter and an outer diameter. In some implementations, the outer diameter is substantially greater than the inner diameter of the inflatable annulus structure 700, such as at least two times greater than the inner diameter. The inflatable annulus structure 700 can comprise a substantially impervious barrier membrane 710, where a material of the barrier membrane 710 is low in thermal conductivity. For example, the barrier membrane 710 can be formed out of substantially impervious Mylar® barrier film material. In some implementations, the inflatable annulus structure 700 can be constructed by sealingly connecting two same-size planar annuli together along their edges. In particular, the inflatable annulus structure 700 can be constructed out of two planar disks that are joined along the inner diameter and the outer diameter of the inflatable annulus structure 700. Rather than forming the inflatable annulus structure 700 out of gores, the inflatable annulus structure 700 can have a planar construction to provide greater geometric stability.

The barrier membrane 710 of the inflatable annulus structure 700 can be confined by a plurality of tendons 725. The plurality of tendons 725 may also be referred to as a plurality of straps, cords, ribs, or restraining members. Each of the plurality of tendons 725 may wrap around the barrier membrane 710 in a poloidal direction. This means that each of the tendons 725 may be disposed around a tubular body of the barrier membrane 710. The plurality of tendons 725 may be regularly spaced apart along the inflatable annulus structure 700 in a toroidal direction. In some implementations, the plurality of tendons 725 can include a material that is flexible, high in strength, and low in thermal conductivity. In some implementations, the material of the plurality of tendons 725 can include an aromatic polyester material such as Vectran®.

As the inflatable annulus structure 700 is inflated and pressurized, the inflatable annulus structure 700 increases in volume. However, bulges 720 can form in the barrier membrane 710 between adjacent tendons 725 as the tendons 725 locally confine portions of the inflatable annulus structure 700 when inflated. This introduces perimeter undulations in the shape of the inflatable annulus structure 700. Specifically, the tendons 725 draw parts of the surface of the barrier membrane 710 inwards, transferring global pressure from the barrier membrane 710 to the tendons 725. The plurality of tendons 725 act as a restraint structure to substantially bear the global pressure load induced on the inflatable annulus structure 700. The barrier membrane 710 is permitted to carry the local hoop stress within its bulges 720 between adjacent tendons 725. As a result, the barrier membrane 710 is relieved of bearing the global pressure load of the inflatable annulus structure 700. Therefore, by directing the global induced stress to the tendons 725, the inflatable annulus structure 700 is structurally determinate and provides stability, predictability, and reproducibility. The inflatable annulus structure 700 provides scalable and predictable structural performance using high strength tension-bearing materials.

Figure 8A:
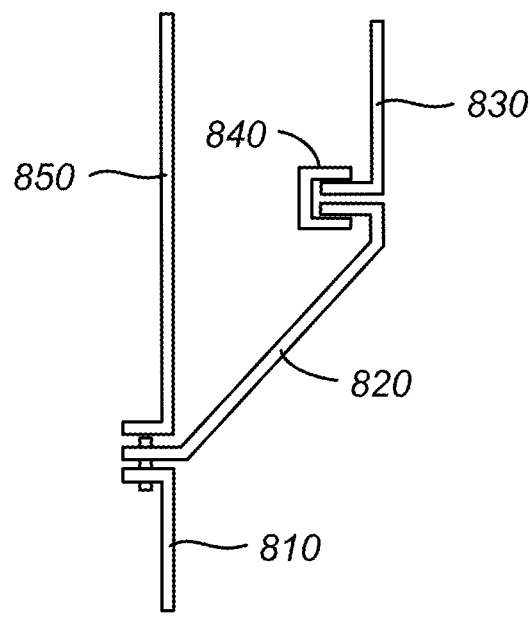
FIG. 8A shows a schematic diagram illustrating interconnections between a payload and a payload adapter, and a payload adapter and a thermally conductive skirt.

FIG. 8A shows a schematic diagram illustrating interconnections between a payload and a payload adapter, and a payload adapter and a thermally conductive skirt. A space vehicle can support a payload 830 on a payload adapter 820. It will be understood that the payload 830 represented in FIG. 8A may represent only a portion a payload in a space vehicle or a structural connection to a payload of a space vehicle. An interface 840 can be formed between the payload 830 and the payload adapter 820. In some implementations, the interface 840 includes a clamp or other interconnecting element. For example, the interface 840 may include a frangible joint connection as described above. The payload adapter 820 may be connected to a thermally conductive skirt 810, where the thermally conductive skirt 810 is connected to one or more walls of a cryogenic fuel tank. As used herein, the thermally conductive skirt 810 may also be referred to as a thermally conductive body, load-bearing body, or truss structure. A fairing 850 may enclose or house the payload 830.

Figure 8B:
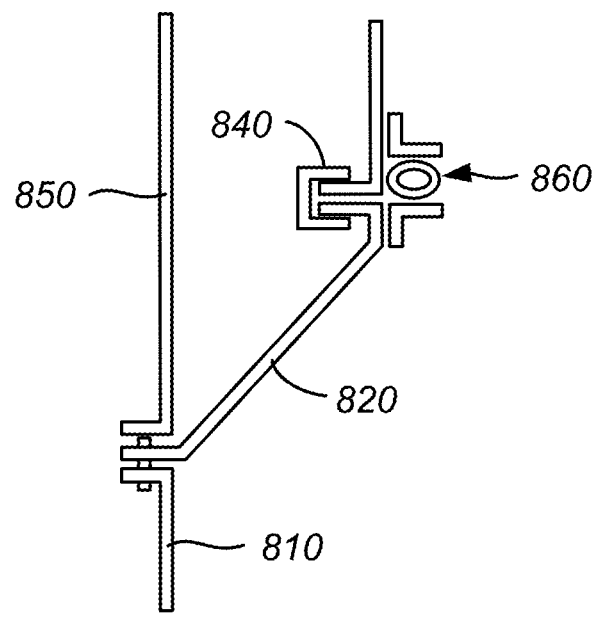
FIG. 8B shows a schematic diagram illustrating the interconnections in FIG. 8A and a joint assembly at the interconnection between the payload and the payload adapter.

FIG. 8B shows a schematic diagram illustrating the interconnections in FIG. 8A and a joint assembly at the interconnection between the payload and the payload adapter. A joint assembly 860 as described in the present disclosure can be provided at the interface 840 between the payload 830 and the payload adapter 820. In such implementations, the joint assembly 860 is integrated in the space vehicle at a position closer to the payload 830 but farther from a cryogenic fuel tank.

Figure 8C:
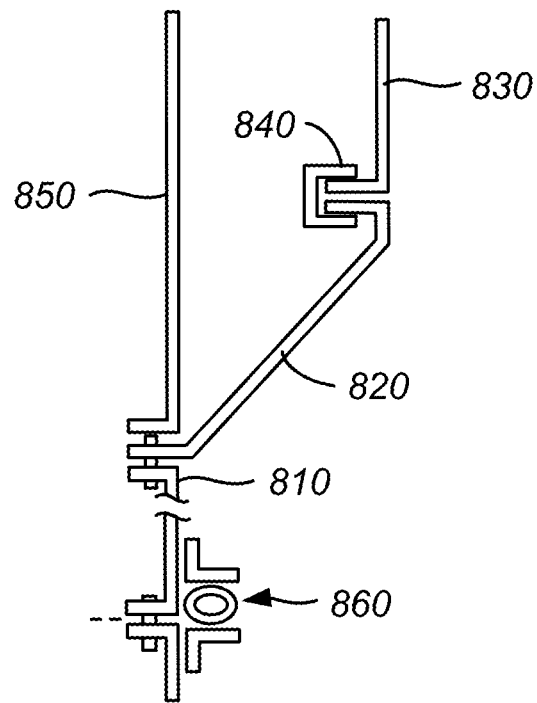
FIG. 8C shows a schematic diagram illustrating the interconnections in FIG. 8A and a joint assembly at a position along the length of the thermally conductive skirt.

FIG. 8C shows a schematic diagram illustrating the interconnections in FIG. 8A and a joint assembly at a position along the thermally conductive skirt. The joint assembly 860 as described in the present disclosure can be provided at a position along the thermally conductive skirt 810. In such implementations, the joint assembly 860 is integrated in the space vehicle at a position closer to a cryogenic fuel tank but farther from the payload 830.

Figures 9A, 9B:
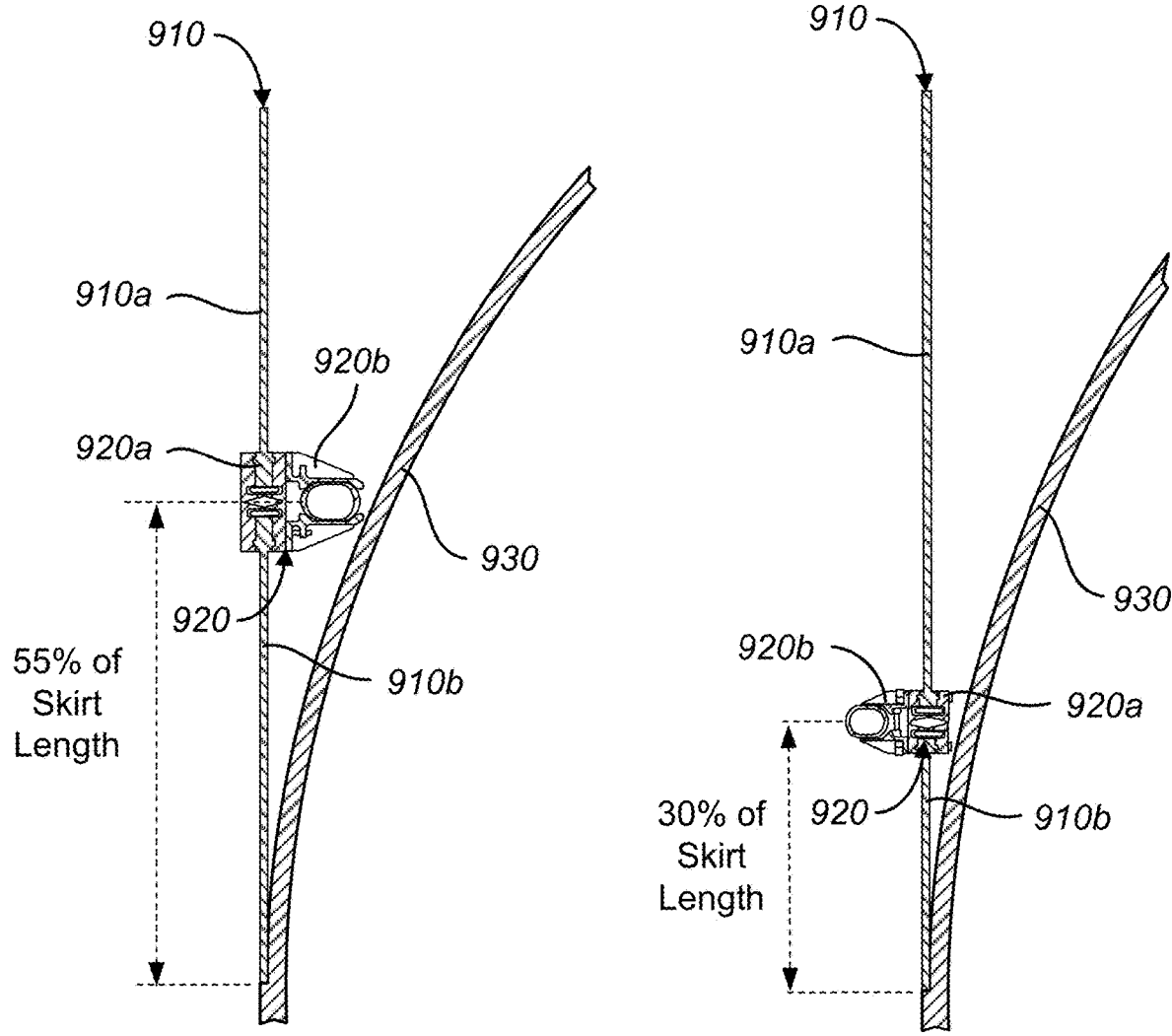
FIG. 9A shows a side view of a joint assembly positioned at a certain distance along a length of a thermally conductive skirt according to some implementations.
FIG. 9B shows a side view of a joint assembly positioned at a certain distance along a length of a thermally conductive skirt according to some other implementations.

FIG. 9A shows a side view of a joint assembly positioned at a certain distance along a length of a thermally conductive skirt according to some implementations. FIG. 9B shows a side view of a joint assembly positioned at a distance along a length of a thermally conductive skirt according to some other implementations. A joint assembly 920 of the present disclosure can include a primary joint 920a and a secondary joint 920b. The joint assembly 920 can be integrated at a position along the length of a thermally conductive skirt 910. The thermally conductive skirt 910 can be connected to one or more walls of a cryogenic fuel tank 930. Where the joint assembly 920 is integrated in the thermally conductive skirt 910, the joint assembly 920 can be connected to an upper section 910a of the thermally conductive skirt 910 and a lower section 910b of the thermally conductive skirt 910. As shown in FIG. 9A, the joint assembly 920 can be positioned at 55% of the length of the thermally conductive skirt 910. As shown in FIG. 9B, the joint assembly 920 can be positioned at 30% of the length of the thermally conductive skirt 910.

Returning to FIG. 1, a joint assembly such as a thermally isolating joint assembly 280 in FIG. 2B, a joint assembly 300 in FIGS. 3A-3C, a joint assembly 400 in FIGS. 4A-4C, a joint assembly 860 in FIGS. 8B-8C, or a joint assembly 920 in FIGS. 9A-9B may be part of a space vehicle 100. The space vehicle 100 can include a payload section 120 housing a payload 130. The space vehicle 100 can further include a cryogenic fuel tank 140 and a thermally conductive body connected to the cryogenic fuel tank 140, where the thermally conductive body is connected between the cryogenic fuel tank 140 and the payload section 130. The thermally conductive body can include the shell 170 and/or payload adapter 160 as shown in FIG. 1. The space vehicle 100 can further include a joint assembly of the present disclosure integrated at a position along the thermally conductive body.

The thermally conductive body can include a forward portion and an aft portion, where the forward portion may also be referred to as an upper portion and the aft portion may also be referred to as a lower portion. The forward portion may provide structural connection to the payload section 120 of the space vehicle 100 and the aft portion may provide structural connection to the cryogenic fuel tank 140 or an energy storage section of the space vehicle 100. The joint assembly of the present disclosure may include a primary joint between the forward portion and the aft portion of the thermally conductive body, where the primary joint is configured to disconnect and form a gap between the forward portion and the aft portion of the thermally conductive body. The joint assembly of the present disclosure may further include a secondary joint adjacent to and connected to the primary joint, where the secondary joint is configured to maintain structural connection between the forward portion and the aft portion of the thermally conductive body when the primary joint is disconnected. The secondary joint may provide thermal isolation between the forward portion and the aft portion. In some implementations, the secondary joint includes at least one inflatable annulus structure with a tubular body configured to exert increased compression on the secondary joint when the primary joint is disconnected, and at least one restraining member constraining the at least one inflatable annulus structure when the primary joint is disconnected. The tubular body includes a barrier membrane and each inflatable annulus structure includes a plurality of tendons disposed around the tubular body of the barrier membrane. In some implementations, the forward portion has a higher temperature than the aft portion of the thermally conductive body.

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. An apparatus comprising:
   a primary joint system between a first structure and a second structure, wherein the primary joint system is configured to disconnect to separate the first structure from the second structure; and
   a secondary joint system adjacent to and connected to the primary joint system, wherein the secondary joint system is configured to maintain structural connection between the first structure and the second structure when the primary joint system is disconnected, the secondary joint system including:
   at least one inflatable annulus structure; and
   at least one restraining member, wherein each of the at least one inflatable annulus structure and the at least one restraining member is thermally insulating.

2. The apparatus of claim 1, wherein the at least one inflatable annulus structure is in compression and the at least one restraining member is in tension to constrain the at least one inflatable annulus structure when the primary joint system is disconnected.

3. The apparatus of claim 1, wherein the at least one inflatable annulus structure occupies an increased volume upon the primary joint system being disconnected.

4. The apparatus of claim 1, wherein each inflatable annulus structure includes a barrier membrane and a plurality of tendons disposed around a tubular body of the barrier membrane.

5. The apparatus of claim 4, wherein the plurality of tendons are configured to substantially bear global pressure loads induced on the secondary joint system.

6. The apparatus of claim 1, wherein the first structure includes a payload of a space vehicle and the second structure includes a cryogenic fuel tank of the space vehicle.

7. The apparatus of claim 1, wherein an outer diameter of the at least one inflatable annulus structure is substantially greater than an inner diameter of the at least one inflatable annulus structure.

8. The apparatus of claim 1, wherein the at least one inflatable annulus structure includes two or more inflatable annulus structures in contact with one another.

9. The apparatus of claim 1, wherein the primary joint system includes a frangible joint connection.

10. The apparatus of claim 9, wherein the primary joint system further includes one or more expandable tube assemblies configured to be expanded to cause breakage of the frangible joint connection.

11. The apparatus of claim 1, wherein the at least one inflatable annulus structure is disposed between a first shelf and a second shelf, the first shelf and the second shelf being connected to the primary joint system.

12. The apparatus of claim 1, wherein the at least one restraining member is configured to accommodate axial, transverse, and moment forces induced on the secondary joint system to provide lateral and rotational stability for a payload of a space vehicle.

13. The apparatus of claim 1, wherein the at least one inflatable annulus structure includes a first material having a low thermal conductivity and the at least one restraining member includes a second material having a low thermal conductivity.

14. The apparatus of claim 13, wherein the first material includes Mylar® and the second material includes Vectran®.

15. A space vehicle comprising:
a payload section housing a payload;
a cryogenic fuel tank;
a thermally conductive body connected to the cryogenic fuel tank, wherein the thermally conductive body is connected between the cryogenic tank and the payload section; and
a joint assembly integrated at a position along the thermally conductive body, wherein the joint assembly includes:
a primary joint between a forward portion and an aft portion of the thermally conductive body, wherein the primary joint is configured to disconnect and form a gap between the forward portion and the aft portion of the thermally conductive body;
a secondary joint adjacent to and connected to the primary joint, wherein the secondary joint is configured to maintain structural connection between the forward portion and the aft portion of the thermally conductive body when the primary joint is disconnected, wherein the secondary joint includes:
at least one inflatable annulus structure with a tubular body configured to exert increased compression on the secondary joint when the primary joint is disconnected; and
at least one restraining member constraining the at least one inflatable annulus structure when the primary joint is disconnected.

16. The space vehicle of claim 15, wherein the tubular body includes a barrier membrane and each inflatable annulus structure includes a plurality of tendons disposed around the tubular body of the barrier membrane.

17. The space vehicle of claim 15, wherein the secondary joint provides thermal isolation between the forward portion and the aft portion of the thermally conductive body.

18. The space vehicle of claim 15, wherein the forward portion has a higher temperature than the aft portion of the thermally conductive body.

19. The space vehicle of claim 15, wherein the primary joint includes a frangible joint connection.

* * * * *